Sept. 11, 1962 M. PEARLSTINE Re. 25,239

GLIDER CONSTRUCTION

Original Filed July 16, 1958 2 Sheets-Sheet 1

INVENTOR.
MORTON PEARLSTINE
BY L. Earl Kelson
ATTORNEY

Sept. 11, 1962 M. PEARLSTINE Re. 25,239

GLIDER CONSTRUCTION

Original Filed July 16, 1958 2 Sheets-Sheet 2

INVENTOR.
MORTON PEARLSTINE
BY Leon Edelson
ATTORNEY

United States Patent Office

Re. 25,239
Reissued Sept. 11, 1962

25,239
GLIDER CONSTRUCTION

Morton Pearlstine, Bala Cynwyd, Pa., assignor to The Bunting Company, Inc., Philadelphia, Pa., a corporation of Pennsylvania Original No. 2,959,210, dated Nov. 8, 1960, Ser. No. 748,889, July 16, 1958. Application for reissue Dec. 9, 1960, Ser. No. 75,041
9 Claims. (Cl. 297—344)

Matter enclosed in heavy brackets [ ] appears in the original patent but forms no part of this reissue specification; matter printed in italics indicates the additions made by reissue.

This invention relates to sitting furniture, and more particularly to sitting furniture of the type known as gliders. Gliders are characterized by their ability to oscillate with a generally forward and backward gliding motion under the control of an occupant of the glider seat, such motion giving rise to the generic name "glider."

In the past, various types of so-called gliders have been devised which provide a motion more nearly like that of a swing than that of a true glider but which nevertheless are classed as gliders. Generally, these devices include a stand which rests on the floor and from which is freely suspended by pivoted vertical hangers a seat of some kind. As the seat is moved back and forth by the occupant it rises and falls much in the manner of a pendulum. Moreover, because of the hanger suspension system, an appreciable undesirable side-sway usually occurs unless the fore and back motion is restricted. The combined pendulum motion and side-sway is generally unpleasant and is sometimes unsettling to the stomach. Also annoying is the tendency of the seat to knock against the stand when the glider is being operated which causes the seat to twist and shudder.

My invention differs from these so-called gliders in that it is not subject to the shortcomings hereinbefore described, but is in fact a true glider and not a modified swing. Accordingly, it is a principal object of my invention to provide a novel glider whose seat motion is characterized by being substantially rectilinear in the fore and back directions.

Another object of my invention is to provide a novel glider which is free of side-sway during use.

Still another object of my invention is to provide a novel glider which has no tendency to impart a twisting motion to the seat when the latter is in motion.

Yet another object of my invention is to provide a novel glider which has a stable rest position from which the seat does not tend to wander unless urged by an occupant.

These and other objects will become clear from a careful reading of the following specification in conjunction with an examination of the several drawings, wherein.

In the several figures like elements are identified by the same reference numerals.

Figure 1:
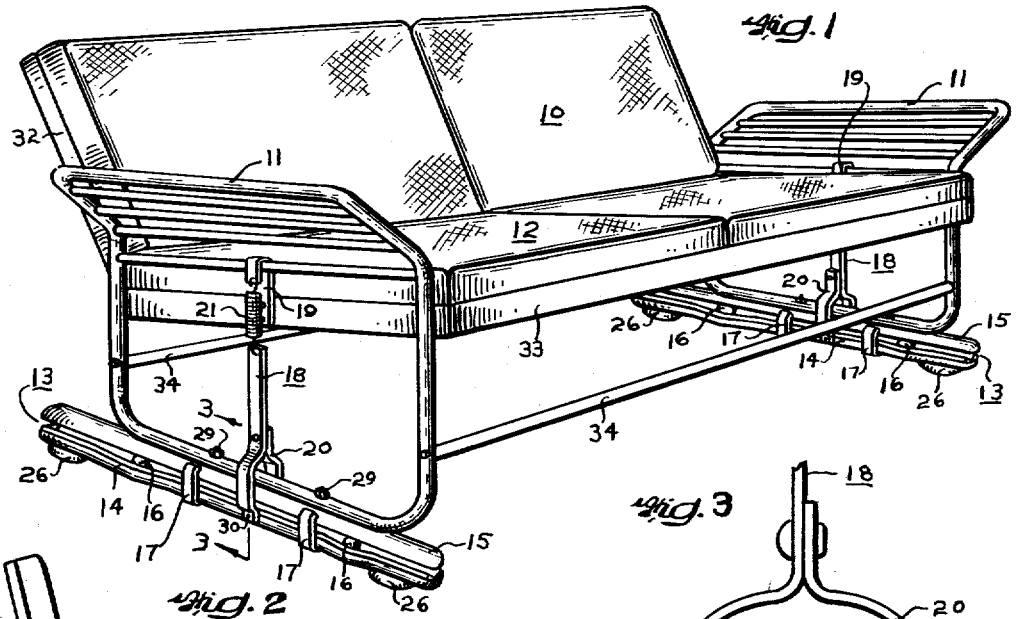
FIGURE 1 is a perspective view of a multiple seat glider constructed according to and embodying the principles of the invention.
Figure 2:
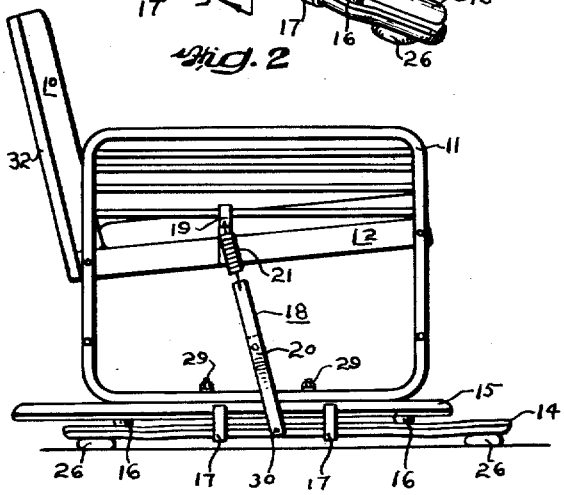
FIGURE 2 is a side elevation of the glider of FIGURE 1 illustrating the seat in rearward displaced position.

Turning now to a consideration of FIGURES 1 and 2 for a general understanding of the glider structure and manner of operation, it will be seen that the glider consists essentially of three major types of functional unit. The first functional unit consists of a superstructure which includes a back-rest assembly 10 and a pair of side frame and arm-rest assemblies 11 secured to a seat assembly 12. The second functional unit consists of a pair of double track assemblies 13, which assemblies include a pair of floor engaging lower track sections 14 and a pair of upper track sections 15, to which latter sections the side frames 11 of the first unit are secured. A pair of ball bearings 16 between the upper and lower track sections of each double track assembly 13 provide a low friction translation bearing which permits relative fore and aft motion of the upper track sections 15 relative to the lower track sections 14. Since the side frames 11 of the first unit are rigidly secured to the upper track sections 15 of the second unit, the first unit will of course travel with the upper tracks 15 as they move fore and aft. Each double track assembly 13 also includes a pair of lateral retainer brackets 17 secured to the lower track section 14 and the non-engaging partially overlying the upper track section 15 to prevent the latter from sidewise shifting. The third functional unit consists of a pair of linkages 18 rigidly secured at their upper end to the seat assembly 12 and side frame assemblies 11 of the first unit by a bracket 19, and pivotally secured at their lower end to the lower track section 14 of the second functional units by a yoke 20. The bracket 19 and yoke 20 are intercoupled by an extensible spring 21.

In operation, the first functional unit and the upper track sections 15 ride back and forth on the ball bearings 16 which roll in the bottom track sections 14 along a straight-line path, thus accomplishing the objects of eliminating the undesirable pendulum swing motion, side-sway, and twisting motion previously described. The linkages 18, together with a particular structural configuration of the lower track section 14 to be subsequently described, operate to provide a stable rest position from which the seat does not tend to wander unless urged by an occupant. As the seat moves either backward or forward from its at-rest position illustrated in FIGURE 1, the spring 21 of the linkage 18 is stretched and therefore exerts a restoring force which tends to pull the seat back to the centered at-rest position. FIGURE 2 illustrates a backward displaced condition of the seat, and it is readily seen that the yoke 20 has tilted backwards in response to the pull of the stretched spring 21.

Figure 3:
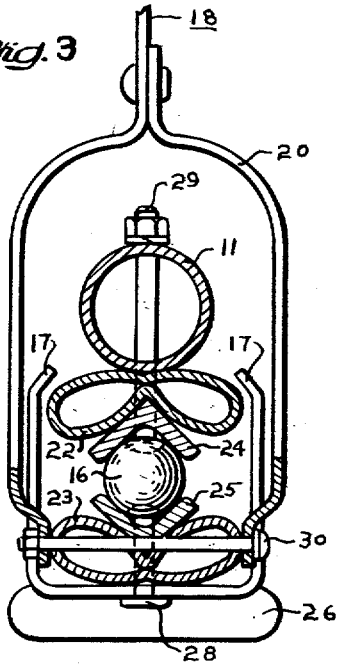
FIGURE 3 is a cross-sectional view of the glide mechanism taken along the lines 3—3 of FIGURE 1.
Figure 4:
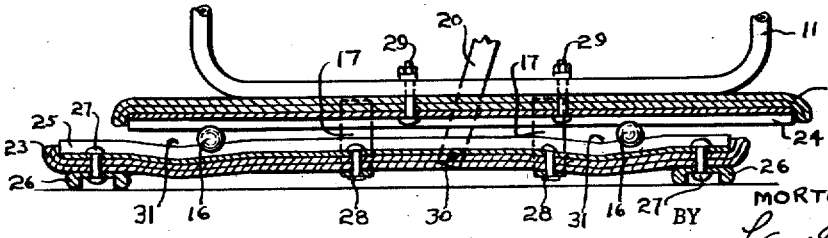
FIGURE 4 is an enlarged fragmented side sectional view of the gliding mechanism illustrating the ball-bearing support for the seat frame.

For a clear understanding of the important constructional details of the invention turn now to a consideration of FIGURES 3 and 4. The cross-sectional view of FIGURE 3 shows that the upper and lower track sections 15 and 14 illustrated in FIGURES 1 and 2 preferably comprise respectively a pair of crushed and V-formed tubular members 22 and 23 having angle-members 24 and 25 secured thereto by the bolts 29 and rivets 28, the open angle-member faces presenting vertically toward each other and held in spaced relation by the ball bearings 16. Additionally, the same rivets 28 secure the lateral retainer brackets 17 to the lower track section, and the same bolts 29 secure the lower rail of the side frames 11 to the upper track section. The yoke 20 of the linkage 18 is pivotally pinned to the tubular member 23 of the lower track section by the bolt 30.

*Each of the ball bearings 16 is observed to contact each of the associated track angle members 24 and 25 at two laterally spaced points, the points of contact being located on the opposite interior sloping faces of each angle member. This structure achieves two highly desirable ends. First, the point contacts between the ball bearings and the angle members result in a very low friction bearing, it being apparent that when the glider is in motion the successively occurring points of contact between a ball and its angle members define lines of contact extending fore and aft of the tracks. The instantaneous point contacts or the aggregate of such which define the lines of contact are laterally symmetrically located relative to a vertical plane passing fore and aft through the center of the ball so that rolling ball motion without dragging is accomplished. Thus, minimum friction and minimum wear is simultaneously provided for smooth acting, long wearing, trouble-free bearing operation.*

*Second, an analysis of the vector forces operative on the ball and angle member track structure shows that the downward weight on the ball transmitted by each of the upper track interior faces includes a force component directed vertically downward and a force component directed horizontally inward. The inward forces from the opposite faces of course balance one another and maintain the ball in centered position. A similar condition exists between the ball and the lower track. Because the angle members cannot rotate or roll around laterally on the ball, lateral shifting or side sway could only occur if the entire seat superstructure loaded with the weight of persons sitting thereon were to rise so that one interior face of the top angle member could then laterally shift toward the ball while the other face lost contact therewith. The improbability of such an occurrence is manifest. Even so, there exists a counterbalancing oppositely directed force tending to prevent such an occurrence. This counterbalancing force is exerted by the interior face of the lower angle member which lies diametrically across the ball from the face of the upper angle member which tends to move inward toward the ball. Thus, the forces involved always tend toward lateral stability of the glider while simultaneously providing a free rolling bearing for motion in the fore and aft directions.*

Th sectional view of FIGURE 4 provides a different view of the elements seen in FIGURE 3 and additionally shows that the tubular member 23 and angle member 25 of each lower track section 14 are dimpled downward as at 31 to provde a very shallow but definite valley. These dimples are so located that the ball bearings 16 lie therein when the seat is in its centered at-rest position as illustrated in FIGURE 1. By virtue of this dimpled construction and the spring-loaded linkages 18, the seat tends to remain in its centered position when the occupant does not actively urge it backward or forward. It should be noted that the shallowness of the valley and smoothness of curvature are such as to preclude any awareness by the seat occupant of departure from straight line motion while at the same time being sufficient to effect the at-rest centering of the seat. In this figure the ball bearings 16 are illustrated forward of the valley bottom and the yoke 20 is seen to be pivoted forward, whereas in FIGURE 2 the ball bearings are shown rearward of the valley bottom and the yoke 20 is pivoted backward, corresponding of course respectively to forward and rearward displacement of the seat. The foot pads 26, which appear in all of the figures, are seen in FIGURE 4 to be secured to the lower track section by the rivets 27 which pass through the tubular member 23 and angle-member 25. No motion-limiting stops are specifically shown as such because a wide variety of devices can be readily employed. For example, the downcurved forward and rear ends of the tubular member 22 of the upper track sections of themselves provide a stop for the ball bearings. Moreover, the heads of the rivets 27 and 28 in the lower track section can also provide a stop. Furthermore, a loose cage can be placed around the individual ball-bearings with extending projections which engage the foot pads 26 when the seat is displaced a predetermined distance forward or rearward.

Figure 5:
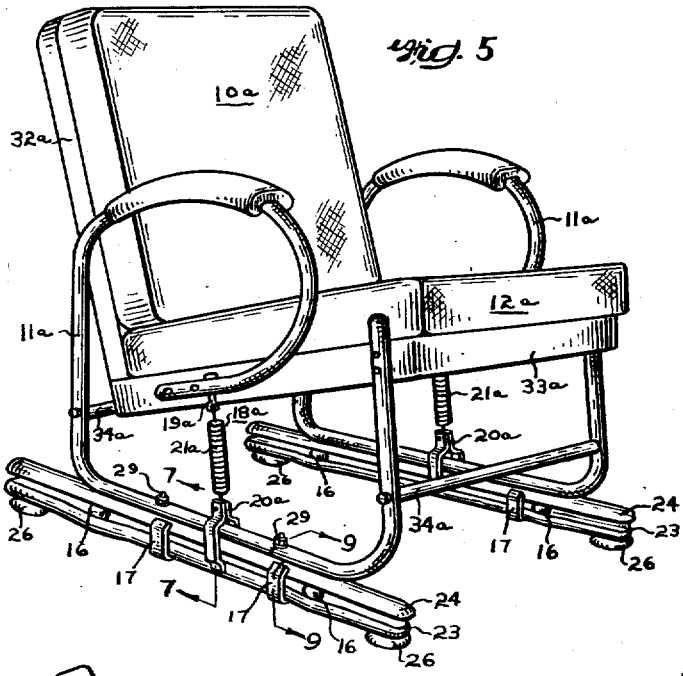
FIGURE 5 is a perspective view of a single seat glider chair constructed according to and embodying the principles of the invention.
Figure 9:
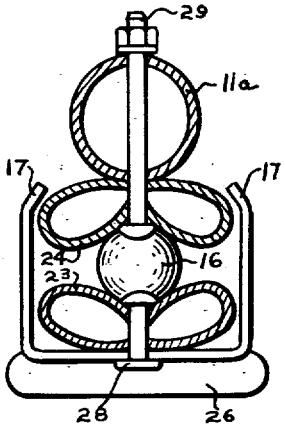
FIGURE 9 is a cross-sectional view of the glide mechanism taken along the lines 9—9 of FIGURE 5.
Figure 7:
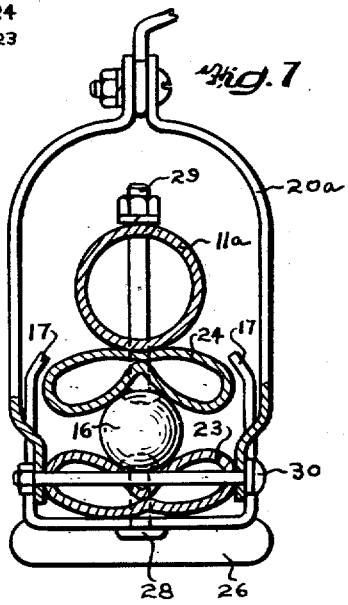
FIGURE 7 is a cross-sectional view of the glide mechanism taken along the lines 7—7 of FIGURE 5.
Figure 6:
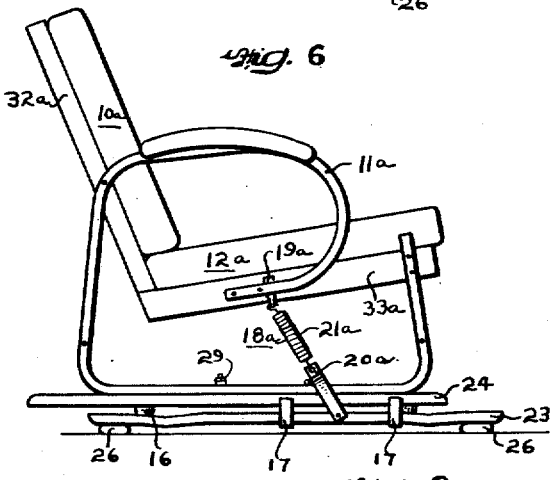
FIGURE 6 is a side elevation of the glider of FIGURE 5 illustrating the seat in rearward displaced position.
Figure 8:
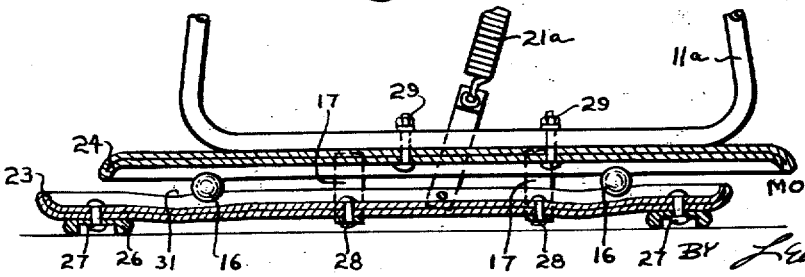
FIGURE 8 is an enlarged fragmented side section view of the gliding mechanism illustrating the ball-bearing support for the seat frame.

Understanding now the principles of construction and operation of the multiple seat glider illustrated in FIGURES 1 through 4, turn to a consideration of the single seat glider illustrated in FIGURES 5 through 9. It will be observed that with the exception of the particular side frame and seat configuration, the glider of FIGURE 5 is substantially identical in design to the glider of FIGURE 1. With regard to the principles of operation they are identical, there existing a one-to-one correspondence between functional elements of the gliders of FIGURE 1 and FIGURE 5 with the sole exception that the angle members 24 and 25 most clearly illustrated in FIGURES 3 and 4 have been dispensed with in corresponding FIGURES 7 and 8. These angle members are considered necessary in the multiple seat glider of FIGURE 1 to prevent deformation of the tubular members 22 and 23 because of the heavy bearing load which may be encountered due to the weight of perhaps three occupants. On the other hand, the comparable bearing load encountered in the single seat glider does not present such a problem, and accordingly the angle members may be dispensed with. *It should be noted, however, that elimination of the angle members does not change the relationships between the balls and the V-formed tubular members which now comprise the tracks since the same four-point contact bearing relationship is maintained as has been previously described in connection with the structure illustrated in FIGURES 3 and 4.* Elements in FIGURES 5 through 9 which are functionally equivalent in corresponding elements in FIGURES 1 through 4, but which present a somewhat different appearance, have been designated by the same reference numeral with a lower case "a" suffix added. For example, elements or assemblies identified by the reference numerals 10, 11, 12, 18, 19, 20, 21, 32, 33 and 34 in FIGURES 1 through 4 have their functional counterparts identified in FIGURES 5 through 9 by the reference characters 10a, 11a, 12a, 18a, 19a, 20a, 21a, 32a, 33a, and 34a.

In the various figures, the parts illustrated may be made of any suitable materials. For example, the backrest frames 32 and 32a, seat frames 33 and 33a, side frames 11 and 11a, and side frame tie-rods 34 and 34a may be made of wood or metal; the several parts of the linkages 18 and 18a are preferably made of metal, as are the parts of the upper and lower track assemblies.

It will be understood, of course, that the present invention is susceptible to various changes and modifications which may be made from time to time without departing from the real spirit or general principles thereof, and accordingly it is intended to claim the same broadly, as well as specifically, as indicated by the appended claims.

What is claimed as new and useful is:

1. The combination comprising a superstructure including a seat for an occupant, a double track assembly including a first *straight* track adapted to rest on a supporting surface and a *straight* second track adapted for longitudinal movement relative to said first track, said second track being parallel to and spaced vertically above said first track and being non-engagingly underlying supported thereby through an interposing pair of ball bearings spaced apart lengthwise of said tracks, said ball bearings being longitudinally shiftable relative to both of said tracks and determining the vertical spacing therebetween while maintaining said tracks in said vertically spaced parallel relation by restricting relative lateral movement therebetween, said superstructure being secured to said second track for movement therewith in fore and aft directions from an at-rest position relative to said first track, biasing means intercoupling said first and second tracks effective to bias the said superstructure and second track toward the at-rest position when the latter depart therefrom in either direction, at least one of said tracks having a *shallow* depression formed in the ball bearing contacting portion of the *straight* track surface, and at least one of said ball bearings being positioned in said depression when said superstructure is biased to its at-rest position by said biasing means.

2. The combination according to claim 1 further including means for preventing more than preselected relative lateral movement between said first and second tracks.

3. The combination according to claim 1 further including means secured to said first track for preventing more than a preselected relative lateral movement between said first and second tracks.

4. The combination according to claim 1 further including stop means associated with at least one of said tracks for limiting the longitudinal movement of said second track relative to said first track.

5. The combination according to claim 1 wherein said biasing means intercoupling said first and second tracks comprises a resiliently distendable linkage, one part of said linkage being secured to said superstructure and second track assembly and another part of said linkage being secured to said first track, whereby said superstructure and said second track assume the at-rest position relative to said first track when said linkage is in its minimum distended condition and are biased toward the at-rest position when said linkage is distended beyond said minimum distended condition as a result of departure of said superstructure and second track in either direction from the at-rest position.

6. In a glider, the combination comprising a rigid superstructure including a seat and back-rest, a pair of spaced floor-supported *parallel straight* tracks each having a *shallow* depression in the track surface, a pair of bearings each of which bearingly engages and is adapted for longitudinal motion along a different one of said tracks, said superstructure being secured to said bearings for movement therewith as a unit, and biasing means intercoupling said tracks with said superstructure and bearings unit effective to bias the latter toward a preselected position relative to said tracks, said bearings being disposed within said tracks depressions when said superstructure and bearings unit occupies said preselected position.

7. The combination according to claim 6 wherein said biasing means include a distensible spring characterized by a minimum distended condition when said superstructure and bearings unit occupies said preselected position.

8. In a glider, in combination, a rigid superstructure including a seat and back-rest unit, a pair of laterally spaced parallel *straight* rails secured to the bottom of said superstructure and extending fore and aft thereof, a pair of floor-supported elongated *straight* rails respectively disposed beneath and in substantial *parallel* vertical reigstry with said superstructure rails, revoluble bearings means interposed between each floor-supported rail and its associated superstructure rail for supporting said superstructure upon said floor-supported rails for gliding movement along the latter rails, and means tending constantly to effect return of said superstructure to a central position relatively to said floor-supported rails, each rail of one of said pairs of rails having a *shallow* depression in the bearing contacting surface thereof, and said revoluble bearing means being disposed within said depressions when said superstructure occupies said central position.

9. The combination according to claim 8 further including stop means for limiting fore and aft movement of said superstructure relative to said floor-supported rails.

References Cited in the file of this patent or the original patent

UNITED STATES PATENTS

| | | |
|---|---|---|
| 667,967 | Bunker | Feb. 12, 1901 |
| 667,989 | Norwood | Feb. 12, 1901 |
| 1,366,625 | Zoulek | Jan. 25, 1921 |
| 1,686,145 | Cook | Oct. 2, 1928 |
| 1,956,772 | Morton | May 1, 1934 |
| 2,191,644 | Decker | Feb. 27, 1940 |
| 2,336,433 | Woina | Dec. 7, 1943 |
| 2,579,599 | Moroney | Dec. 25, 1951 |
| 2,667,912 | McCormick | Feb. 2, 1954 |
| 2,715,433 | Dolgorukov | Aug. 16, 1955 |
| 2,792,873 | Herider et al. | May 21, 1957 |
| 2,907,371 | Scott | Oct. 6, 1957 |

FOREIGN PATENTS

| | | |
|---|---|---|
| 466,225 | Great Britain | May 25, 1937 |